United States Patent [19]
Kikuchi

[11] Patent Number: 5,527,606
[45] Date of Patent: Jun. 18, 1996

[54] DISK CASSETTE SHUTTER

[75] Inventor: Shuichi Kikuchi, Miyagi, Japan

[73] Assignee: Sony Corporation, Tokyo, Japan

[21] Appl. No.: 918,471

[22] Filed: Jul. 22, 1992

[30] Foreign Application Priority Data

Jul. 25, 1991 [JP] Japan .................... 3-207183
Jul. 25, 1991 [JP] Japan .................... 3-207184
Aug. 2, 1991 [JP] Japan .................... 3-216497

[51] Int. Cl.$^6$ .............. G11B 23/03; B32B 5/16; B32B 15/08; B32B 27/08
[52] U.S. Cl. .......... 428/324; 360/133; 369/291; 428/426; 428/458; 428/461; 428/474.4; 428/913.3
[58] Field of Search .............. 428/900, 203, 428/457, 458, 474.4, 480, 483, 461, 913.3, 121, 122, 204, 207, 80, 81, 124, 364, 323, 324, 327, 454; 360/97–99, 132, 133, 134, 135; 206/387; 369/291; 156/272.2, 510, 443

[56] References Cited

U.S. PATENT DOCUMENTS

| | | | |
|---|---|---|---|
| 4,517,617 | 5/1985 | Tsuji et al. | 360/133 |
| 4,698,714 | 10/1987 | Sugawara et al. | 360/133 |
| 4,908,726 | 3/1990 | Kato | 360/133 |
| 5,121,380 | 6/1992 | Fujita et al. | 360/133 |
| 5,161,080 | 11/1992 | Funayama et al. | 360/133 |
| 5,226,035 | 7/1993 | Kato et al. | 369/291 |

FOREIGN PATENT DOCUMENTS 0343844  5/1989  European Pat. Off. .
0459743  5/1991  European Pat. Off. .
0459743  12/1991  European Pat. Off. .

OTHER PUBLICATIONS

Patent Abstracts of Japan, vol. 14, No. 64 (P–1002) Feb. 06, 1990, & JP1286190 (Canon Inc) Nov. 17, 1989.

Patent Abstracts of Japan, vol. 16, No. 491 (P–1434) Oct. 12, 1992, & JP4176070 (Mitsubishi) Jun. 23, 1992.

Patent Abstracts of Japan, vol. 15, No. 237 (P–1216) Jun. 19, 1991, & JP03073479 (Iwata Denko) Mar. 28, 1991.

*Primary Examiner*—Paul J. Thibodeau
*Assistant Examiner*—Stephen Sand
*Attorney, Agent, or Firm*—Pasquale Musacchio; Jerry A. Miller

[57] ABSTRACT

The present invention provides a shutter for a protective envelope containing a recording disk, having both satisfactory sliding property and satisfactory heat-resisting property. The shutter is formed by folding a laminated sheet having a first layer formed by folding a laminated sheet having high heat-resisting property and a second layer formed of a material having low frictional property so that the first layer forms the outer surface of the shutter and the second layer form the inner surface of the shutter. The first layer of the laminated sheet ensures the shutter satisfactory heat-resisting performance and the second layer of the same ensures the shutter satisfactory sliding performance. A printed layer or an evaporated metal layer may be formed between the first and second layers of the laminated sheet and/or the first and second layers of the laminated sheet may be colored to enhance the aesthetic appearance of the shutter.

13 Claims, 5 Drawing Sheets

DISK CASSETTE SHUTTER

BACKGROUND

1. Field of the Invention

The present invention relates to an improved disk shutter and a method of manufacturing a shutter for a protective envelope containing, for example, a 3.5 in. flexible disk.

2. Background of the Invention

A protective envelope containing a 3.5 in. flexible disk is conventionally provided with a U-shaped shutter which slides on the protective envelope. Some shutters are formed by pressing a thin stainless steel sheet, some shutters are formed by injection-molding a synthetic resin, such as polypropylene or polyacetal and some shutters are formed by punching out a blank from a synthetic resin sheet, such as a vinyl chloride sheet, and folding the blank.

However, there has been no shutter having both satisfactory sliding properties and satisfactory heat-resisting properties. A stainless steel shutter shows unsatisfactory sliding performance on a protective envelope formed of ABS resin or the like. Stainless shutters are liable to abrade the protective envelope and produce abraded powder. The flexible disk contained in the protective envelope likely to become contaminated by the abraded powder. This is a possible cause of drop-out in recording information on and reproducing recorded information from the flexible disk.

A shutter formed by folding a synthetic resin sheet has poor heat resisting properties. If the protective envelope is stored in a high-temperature atmosphere, the opposite side walls of the shutter are liable to warp away from each other increasing the width W as shown in FIG. 2(B). If the width W of the shutter increases, large gaps are formed between the shutter and the protective envelope can become soiled with dust, which is also liable to cause drop-out. If filler, such as glass fibers, is added to the synthetic resin sheet to improve the heat-resisting property of the shutter, the sliding property of the shutter deteriorates. The protective envelope is then abraded by the shutter when the same slides on the protective envelope to produce abraded powder. If the synthetic resin forming the synthetic resin sheet is softened to improve the sliding property of the shutter, the heat-resisting property of the shutter will be deteriorated. Thus, the improvement of the sliding properties and heat-resisting properties are incompatible.

In manufacturing synthetic resin shutters, for instance, the appearance of the shutters can be improved by forming the shutters in different colors. However, the manufacturing cost of the shutters increases unless the shutters of different colors are manufactured in large lots. The appearance of shutters may be improved by patterns formed by multicolor, multilayer printing. However, it is difficult to select appropriate ink having sufficiently high durability. Metallic relief printing, in particular, is impractical.

SUMMARY OF THE INVENTION

The present invention has been made to relieve the foregoing problems and it is therefore an object of the present invention to provide a shutter satisfactory in both sliding properties and heat-resisting properties.

Another object of the present invention is to provide a method of manufacturing a shutter for a protective envelope containing a disk, capable of enhancing the aesthetic appearance of the protective envelope.

To achieve the object, the present invention provides a shutter for a protective envelope containing a disk, comprising an inner layer to be in sliding contact with the protective envelope, formed of a material having low frictional property, and an outer layer formed of a material having high heat-resisting property.

The present invention provides also a method of manufacturing a shutter for a protective envelope containing a disk, comprising steps of forming a pattern layer on one surface of a transparent sheet by printing or evaporation; gluing together the transparent sheet and an opaque sheet with the pattern layer sandwiched between the transparent sheet and the opaque sheet to form a laminated sheet; punching out a blank for forming a shutter from the laminated sheet; and forming a shutter by folding the blank in a U-shape.

Since the inner layer of this shutter of the present invention thus constructed, to be in sliding contact with the protective envelope is formed of a material having low frictional properties and the outer layer, the shutter has improved sliding properties. Since the outer layer of this shutter is formed of a material having high heat-resisting properties, the width of the shutter will not increase even if the protective envelope provided with the shutter is stored in a high-temperature environment.

A shutter for a protective envelope containing a disk, manufactured by a method in accordance with the present invention is formed by folding a laminated sheet. The laminated sheet is formed by gluing together a transparent sheet carrying a pattern layer formed by printing or evaporation on one surface thereof and an opaque sheet with the pattern layer sandwiched between the transparent sheet and the opaque sheet. Therefore, the colors of the pattern layer formed by printing or evaporation are relieved on the transparent sheet, and the pattern layer is protected by the transparent sheet with the opaque sheet sandwiching the pattern layer therebetween.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE INVENTION

Figure 3:
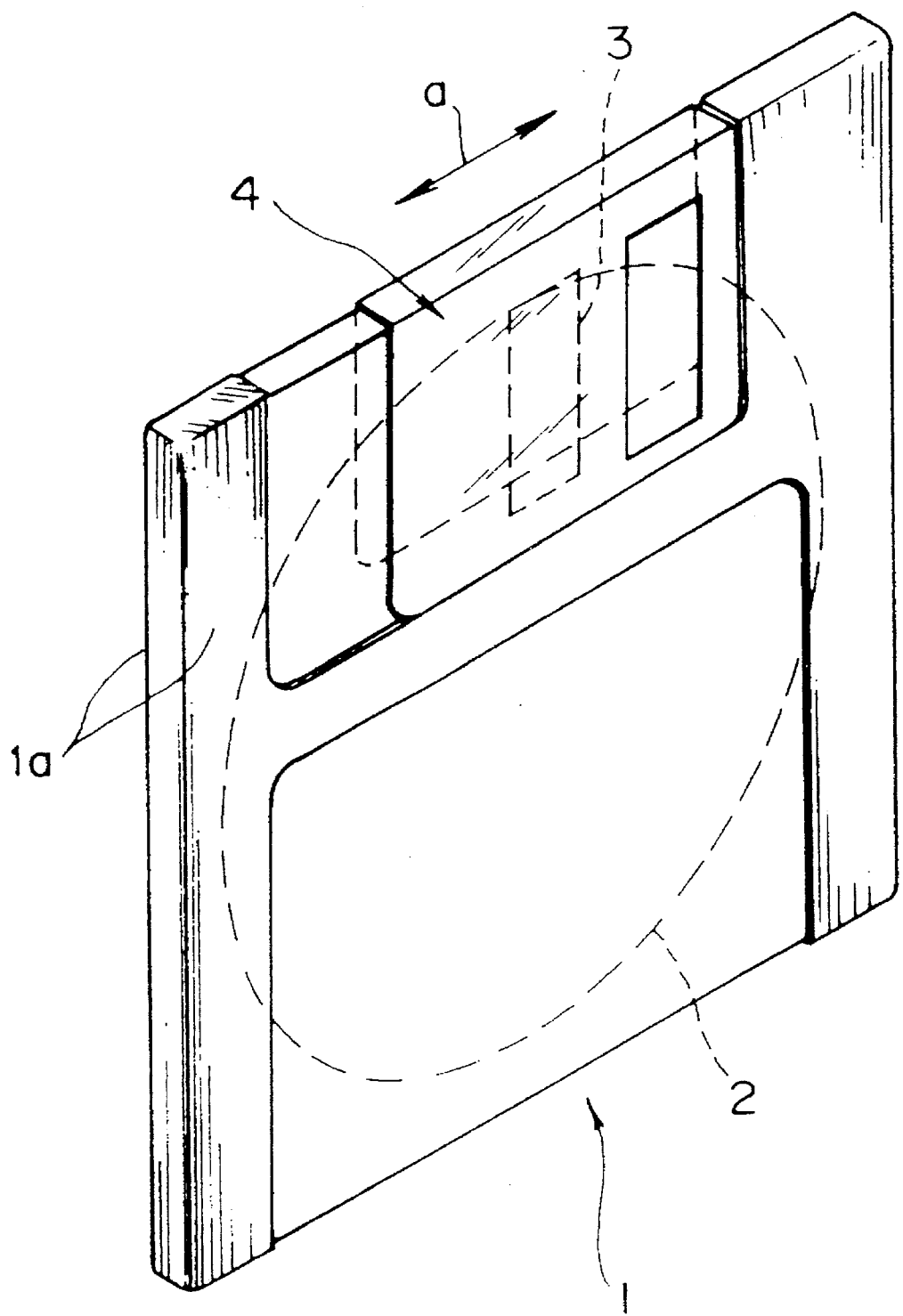
FIG. 3 is a perspective view of a protective envelope containing a recording disk and provided with a shutter.

First a protective envelope and a shutter will be described with reference to FIG. 3. A protective envelope 1 is formed of a synthetic resin, such as ABS resin. The envelope 1 contains a recording medium 2 having the shape of a disk, such as a 3.5 in. flexible disk. Slots 3 are formed in the opposite sides 1a of the protective envelope 1. A U-shaped shutter 4 is installed on the protective envelope 1 for sliding in the directions of the arrows a to open or close the slots 3.

Figure 1:
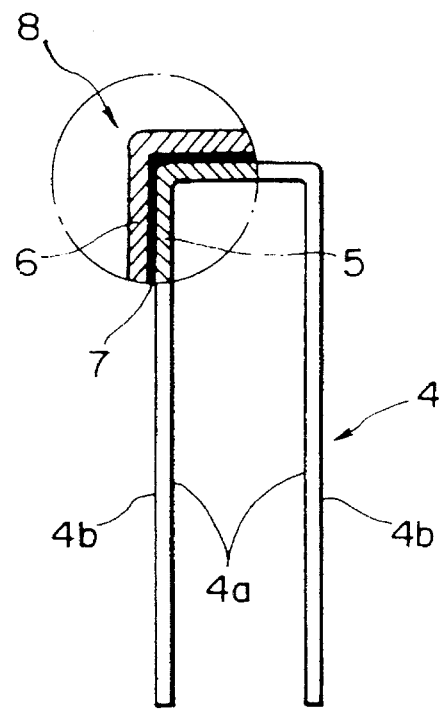
FIG. 1 is a partially enlarged sectional view of a shutter in a first embodiment according to the present invention for a protective envelope containing a recording disk.

Referring to FIG. 1, a first embodiment is disclosed showing a shutter 4. According to the present invention, the shutter 4 is formed by punching out a blank from a laminated sheet 8 and folding the heated blank in a U-shape. The laminated sheet 8 is formed by laminating and gluing together two sheets 5 and 6 with an adhesive 7. In accordance with the present invention, the two sheets 5 and 6 are formed of different materials. By way of example, the sheet 5 forming the inner layer 4a of the shutter 4 (which is in sliding contact with the sides 1a of the protective envelope 1) is formed of a material having a low frictional property and a high abrasion-resisting property. The sheet 6 forming the outer layer 4b of the same is formed of a material having a high heat-resisting property.

The sheet 5 having low frictional property and high abrasion-resisting property may be produced by kneading a mixture of a resin, such as polyacetal resin, polypropylene resin, polyamide resin, polyethylene resin or the like, and a lubricant, such as molybdenum sulfide powder, olefin powder, silicon powder or the like, and forming the kneaded mixture into a sheet. The sheet 6 having a high heat-resisting property may be produced by kneading a mixture of a resin, such as polypropylene resin, polyamide resin or the like, and a heat-resistant material, such as talc, mica, glass fibers or the like, and forming the kneaded mixture into a sheet.

Since the inner layer 4a of the shutter 4 (which is to be in sliding contact with the protective envelope 1) is formed by the sheet 5 having low frictional property and high abrasion-resisting property, the shutter 4 exhibits improved sliding property in sliding on the protective envelope 1. Thus, the abrasion of the protective envelope 1 and the production of abraded powder can be largely suppressed. Since the shutter 4 also has high abrasion-resistance, the shutter 4 is not abraded to produce abraded powder. Accordingly, drop-out in recording information on and reproducing recorded information from the recording medium 2 attributable to the abraded powder entering the interior of the protective envelope 1 through the slots 3 and soiling the recording medium 2 can be effectively prevented.

Figures 2A, 2B:
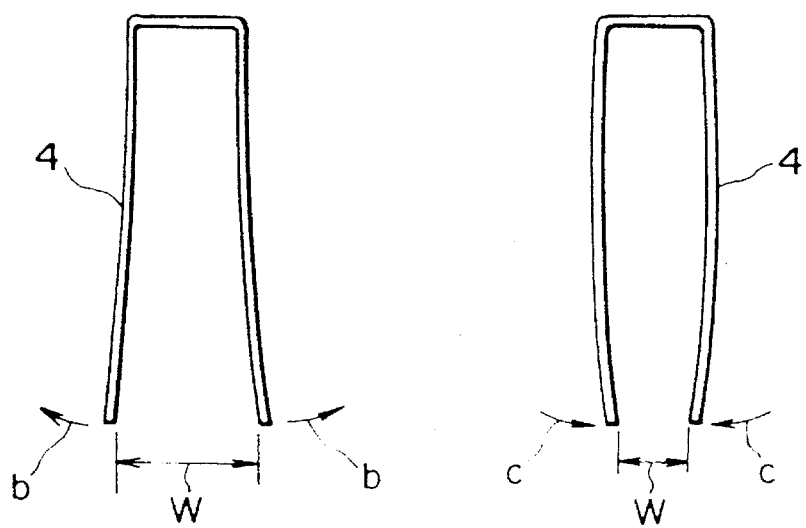
FIGS. 2(A) and 2(B) are side views of assistance in explaining the prevention of increase in the width of shutters.

The side walls of a shutter 4 formed by folding a heated sheet into a U-shape are liable to warp in the directions of the arrows b as shown in FIG. 2(B) to increase the width W of the shutter 4 when the shutter 4 is stored in a high-temperature environment. If the width W of the shutter 4 increases, large gaps are formed between the sides 1a of the protective envelope 1 and the shutter 4. Since the outer layer 4b of the shutter 4 is formed by the sheet 6 having a high heat-resisting property, the width W of the shutter 4 increases only slightly as shown in FIG. 2(A) even if the shutter 4 is stored in a high-temperature environment. Thus, the possibility of forming large gaps between the sides 1a of the protective envelope 1 and the shutter 4, and dust entering the interior of the protective envelope 1 and causing drop-out can be greatly reduced.

When the sheet 5 forming the inner layer 4a of the shutter 4 is a sheet of a material having relatively high heat-shrinking property, such as polypropylene, and the sheet 6 forming the outer layer 4b of the shutter 4 is a sheet of a material having relatively low heat-shrinking property, such as polyester, the side walls of the shutter 4 tend to warp toward each other. Thus, the width W of the shutter 4 tends to decrease as shown in FIG. 2(A) to prevent the increase of the width W positively when the shutter 4 is stored in a high-temperature atmosphere, because the heat-shrinkage of the inner layer 4a of the shutter 4 is higher than that of the outer layer 4b of the same.

If a highly printable sheet, such as a polypropylene sheet or the like, is used as the sheet 6 forming the outer layer 4b of the shutter 4, the outer layer 4b of the shutter 4 can be printed upon by offset printing or the like.

The shutter 4 thus constructed has the following advantages. Since the inner layer 4a of the shutter 4 to be in sliding contact with the protective envelope 1 is formed of a material having low frictional property, the shutter 4 slides easily. The abrasion of the protective envelope 1 by the shutter 4 and the resulting production of abraded powder can be minimized. Accordingly, the possibility of occurrence of drop-out in recording information on and reproducing recorded information from the recording disk contained in the protective envelope 1, attributable to the abraded powder adhering to the recording disk contained in the protective envelope 1 can be minimized.

Since the outer layer 4b of the shutter 4 is formed of a material having a high heat-resisting property, increase in the width W of the shutter when the shutter is stored in a high-temperature environment can be minimized. The possibility of occurrence of drop-out in recording information on and reproducing recorded information from the recording disk contained in the protective envelope 1, attributable to the abraded powder entering the interior of the protective envelope 1 through gaps between the shutter 4 and the protective envelope 1 and adhering to the recording disk contained in the protective envelope can be minimized.

Figure 4:
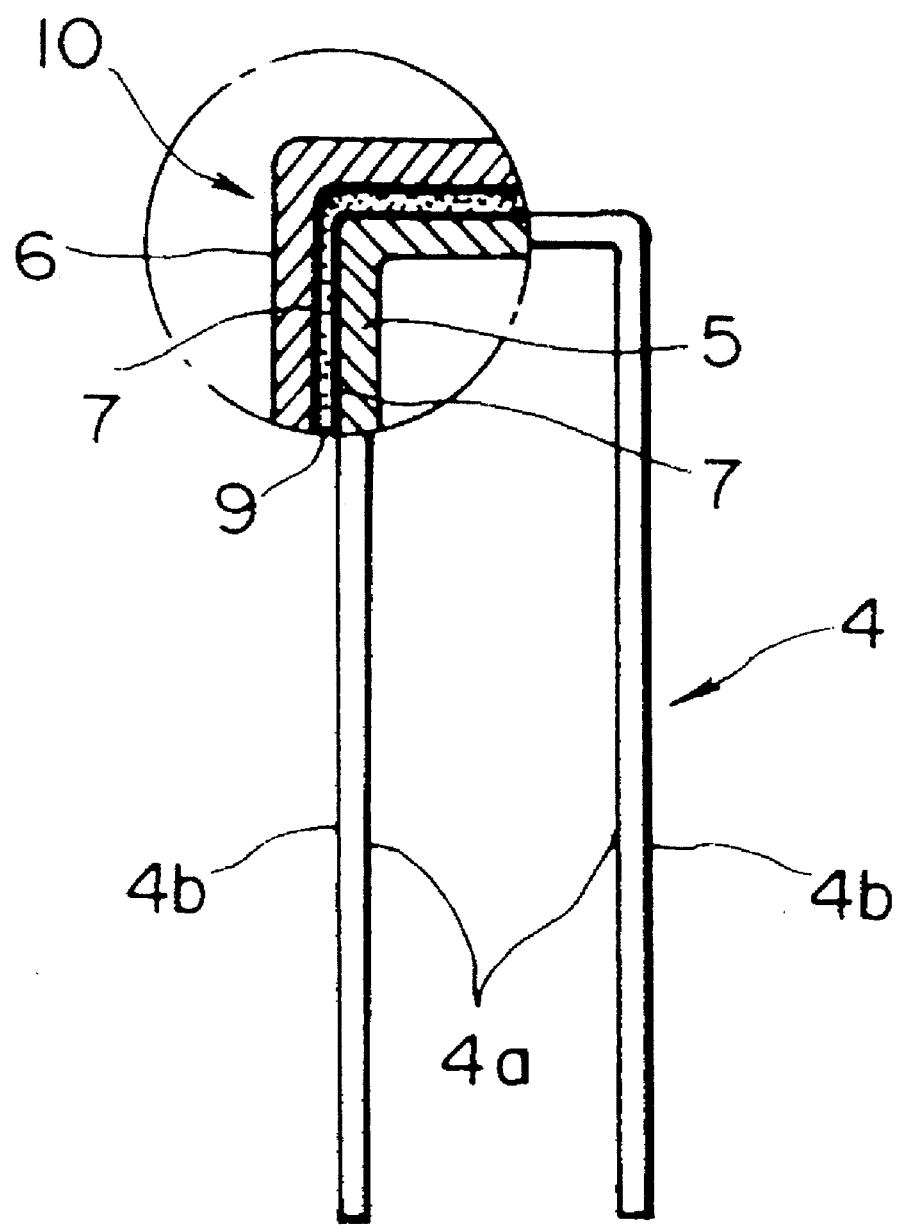
FIG. 4 is a partially enlarged sectional view of a shutter in a second embodiment according to the present invention for a protective envelope containing a recording disk.

Referring to FIG. 4, a shutter 4 in a second embodiment according to the present invention is formed by punching out a blank from a laminated sheet 10, heating the blank and folding it into a U-shape. The laminated sheet 10 is formed by laminating and gluing together a metal foil 8, such as an aluminum foil, a stainless steel foil or the like, and two synthetic resin sheets (hereinafter referred to simply as "sheets") 5 and 6 with an adhesive 7 with the metal foil 7 sandwiched between the sheets 5 and 6.

The shutter 4 has high heat-resisting property because the outer layer 4b of the shutter 4 is formed by the sheet 6 having high heat-resisting property. The metal foil 9 is sandwiched between the sheets 5 and 6. The width W of the shutter 4 increases as shown in FIG. 2(A) even if the shutter 4 is stored in a high-temperature atmosphere. Thus, the possibility of forming large gaps between the sides 1a of the protective envelope 1 and the shutter 4, and dust entering the interior of the protective envelope 1 and causing drop-out can be reduced.

Since the metal foil 9 sandwiched between the sheets 5 and 6 is subjected to plastic deformation when the laminated sheet 10 is folded, the laminated sheet 10 is highly workable and the shutter 4 can be readily formed by folding. Furthermore, since the metal foil 9 undergone plastic deformation contributes to securely maintaining the shutter 4 in the U-shape, the increase of the width W of the shutter 4 beyond a design value can be prevented when the opposite side walls of the shutter 4 are bent toward each other as indicated by the arrows c in FIG. 1(A) in forming the shutter 4 by folding the laminated sheet 10.

A shutter 9 in a third embodiment according to the present invention is formed by folding a laminated sheet formed by gluing together a transparent sheet carrying a pattern layer formed by printing or evaporation on one surface thereof and an opaque sheet with the pattern layer sandwiched between the transparent sheet and the opaque sheet. Therefore, the colors of the pattern layer formed by printing or evaporation are relieved on the transparent sheet, and the pattern layer is protected by the transparent sheet and the opaque sheet sandwiching the pattern layer therebetween. The properties and performance of the materials forming the transparent sheet and the opaque sheet are similar to those of the corresponding sheets forming the shutters 4 in the first and second embodiments, and hence no further description thereof is required.

A method of manufacturing the shutter 9 in the third embodiment will be described hereinafter with reference to FIGS. 5(A) to 5(D). Referring to FIG. 5(A), a laminated sheet 13 is formed by putting together a transparent sheet 11 of a synthetic resin, such as polypropylene, polyacetal, polyamide, polyethylene or the like, and an opaque sheet 12. The transparent sheet 11 is a light-transmissive sheet, such as a colorless, transparent sheet, a translucent sheet or a colored, transparent sheet colored in light red, light yellow or the like, and the opaque sheet 12 is a colored opaque sheet colored in black, dark blue, dark red or the like.

Referring to FIG. 5(A), the transparent sheet 11 and the opaque sheet 12 are pulled out respectively from rolls 11a and 12a. A pattern layer 15 showing, for example, the manufacturer's name and item designation is printed on the lower surface, as viewed in FIG. 5(A), by a first transfer printing unit 14. The pattern layer 15 is dried by a first drying unit 16. A background layer 18, a printed layer or an evaporated metal layer, is formed by a second transfer printing unit (or an evaporating unit) 17 on the same surface of the transparent sheet 11 so as to coat the pattern layer 15. Then the background layer 18 is dried by a second drying unit 19. An adhesive layer 21 is formed on the upper surface, as viewed in FIG. 5(A), of the opaque sheet 12 by an adhesive application unit 20. Then, the transparent sheet 11 and the opaque sheet 12 are pressed together by a pair of pressure rollers 22 to produce the laminated sheet 13.

Figure 5B:
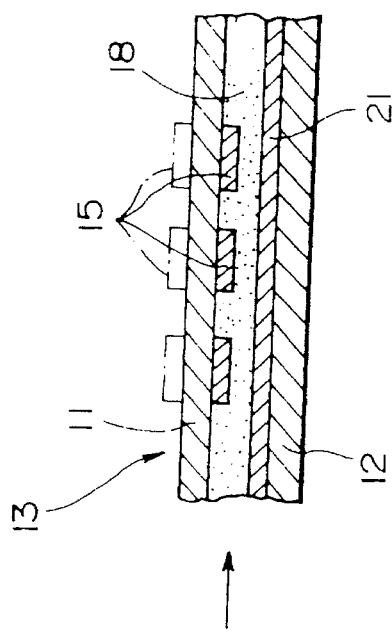
FIGS. 5(A) to 5(D) are views of assistance in explaining processes of fabricating a shutter in a third embodiment according to the present invention for a protective envelope containing a recording disk.

As shown in FIG. 5(B), the laminated sheet 13 thus manufactured has the pattern layer 15 and the background layer 17, i.e., a printed layer or an evaporated metal layer, sandwiched between the transparent sheet 11 and the opaque sheet 12.

Figure 5D:
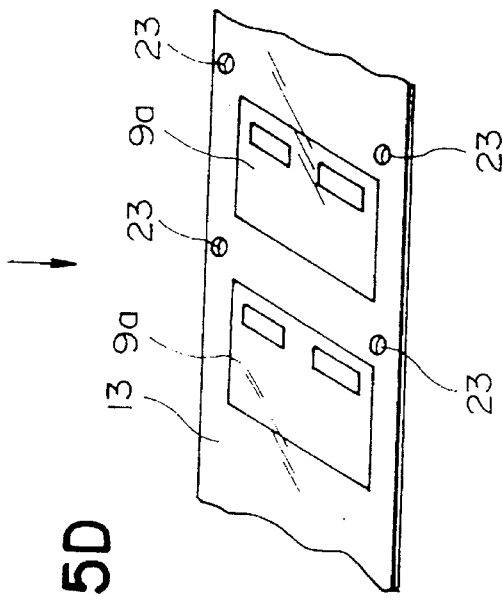
Figure 5A:
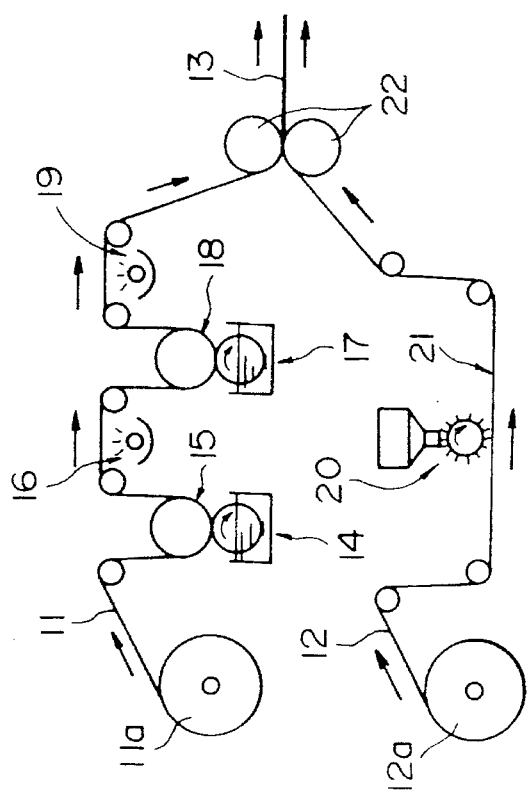
Figure 5C:
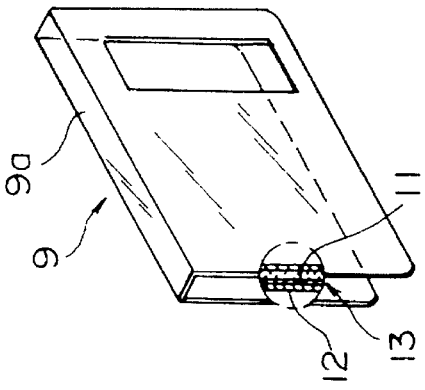

Referring to FIG. 5(C), blanks 9a, i.e., unfolded shutters 9, are punched out successively from the laminated sheet 13 by a press. In punching out the blanks 9a, the laminated sheet 13 is positioned through the detection of positioning marks 23 printed on the transparent sheet 11 in forming the pattern layer 15 or the background layer 18 by photoelectric detectors in order that the blanks 9a are punched out correctly with the proper orientation of the pattern.

Then, as shown in FIG. 5(D), each blank 9a is folded by a press into a U-shape with the transparent sheet 11 forming the outer surface and the opaque sheet 12 forming the inner surface to form a shutter 9.

The colored pattern layer 15 and the colored background layer 18 (or an evaporated metal layer) sandwiched between the transparent sheet 11 and the opaque sheet 12 can be seen in relief through the transparent sheet 11, which enhances the aesthetic value of the shutter 9. Since the pattern layer 15 and the background layer 18 (or an evaporated metal layer) are sandwiched perfectly between the transparent sheet 11 and the opaque sheet 12, the durability of the pattern layer 15 and the background layer 18 (or an evaporated metal layer) is scarcely a problem. Inks for printing the pattern layer 15 and the background layer 18 can be readily selected.

Figure 6A:
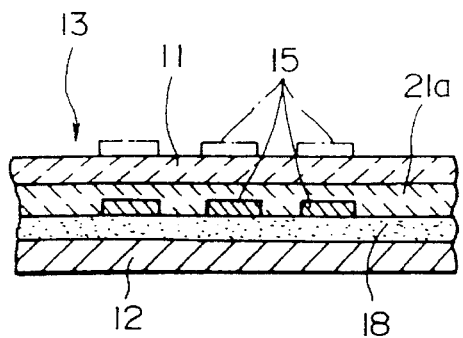
FIGS. 6(A) to 6(D) are sectional views of modifications of the shutter in the third embodiment according to the present invention.

Many modifications of the laminated sheet 13 used for forming the shutter 9 in the third embodiment are possible with several described hereinafter. A laminated sheet 13 shown in FIG. 6(A) is formed by forming a background layer 18, i.e., a printed layer or an evaporated metal layer, on the upper surface of an opaque sheet 12, forming a pattern layer 15 showing manufacturer's name, item designation and the like on the background layer 18 and gluing a transparent sheet 11 to the upper surface of the opaque sheet 12 with a transparent adhesive 21a.

Figure 6B:
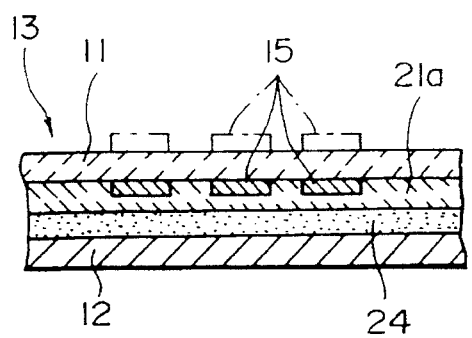

A laminated sheet 13 shown in FIG. 6(B) is formed by printing a pattern layer 15 showing manufacturer's name, item designation and the like on a transparent sheet 11, forming an evaporated metal layer 24, such as an evaporated aluminum layer, over the upper surface of the opaque sheet 12 and gluing together the transparent sheet 11 and the opaque sheet 12 with a transparent adhesive 21a. The evaporated metal layer 24 of this laminated sheet 13 can be seen through the transparent sheet 11 and the transparent adhesive 21a to give the laminated sheet 13 a metallic appearance.

Figure 6C:
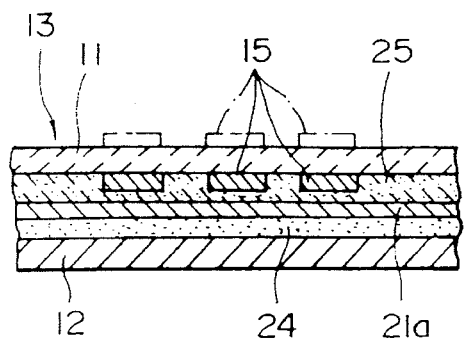

A laminated sheet 13 shown in FIG. 6(C) is formed by printing a pattern layer 15 showing manufacturer's name, item designation and the like on the lower surface of a transparent sheet 11, coating the pattern layer 10 with a lightly colored intermediate transparent layer 25, such as a light yellow transparent layer, by printing, forming an evaporated layer 24, such as an evaporated aluminum layer, on the upper surface of an opaque sheet 12 by evaporation, and gluing together the transparent sheet 11 and the opaque sheet 12 with a transparent adhesive 21a. The evaporated metal layer 24, similarly to the evaporated metal layer 24 of the laminated sheet 13 shown in FIG. 6(B), gives the laminated sheet 13 a metallic appearance.

Figure 6D:
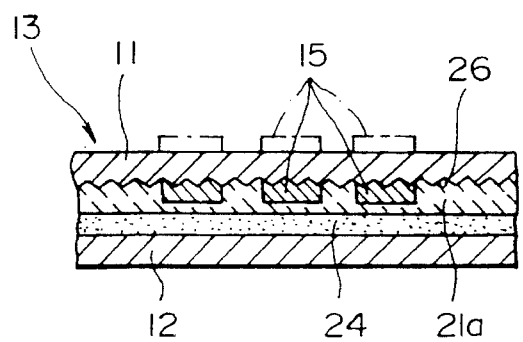

A laminated sheet 13 shown in FIG. 6(D) is formed by forming a holographic pattern 26 in the lower surface (or the upper surface) of a transparent sheet 11, printing a pattern layer 15 showing manufacturer's name, item designation and the like on the lower surface of the transparent sheet 11, forming an evaporated metal layer 14, such as an evaporated aluminum layer, by evaporation on the upper surface of an opaque sheet 12, and gluing together the transparent sheet 11 and the opaque sheet 12 with a transparent adhesive 21a. This laminated sheet 13 has a holographic effect.

The pattern layer 15 showing manufacturer's name, item designation and the like may be printed on the upper surface, i.e., the outer surface, of the laminated sheet 13 as indicated by alternate long and short dash lines in FIGS. 5(B) and 6(A) to 6(D). The pattern layer 15 may be printed by silk printing or pad printing on the outer surface of the shutter 9 formed by punching a blank 9a from the laminated sheet 13 and folding the blank 9a in a u-shape. The opaque sheet 12 may be a metal foil, such as an aluminum foil.

The method of manufacturing a shutter for a protective envelope containing a disk has the following advantages. Since a shutter is formed by folding a blank punched out from a laminated sheet provided with a pattern layer and a background layer formed by printing or evaporation and sandwiched between a transparent sheet and an opaque sheet, the colored pattern layer and the colored background layer can be seen in relief through the transparent sheet, which gives the shutter an aesthetically improved appearance. Since the pattern layer and the background layer are sandwiched protectively between the transparent sheet and the opaque sheet, the durability of the inks forming the pattern layer and the background layer is scarcely a problem and appropriate inks can be readily selected. A shutter having a relieved metallic appearance can be readily produced at a reduced cost by forming an evaporated metal layer, such as an evaporated aluminum layer, between the transparent sheet and the opaque sheet.

Although the invention has been described in its preferred embodiments with particularity, obviously many changes and variations are possible therein. It is therefore to be understood that the present invention may be practiced otherwise than as specifically described herein without departing from the scope and spirit thereof.

What is claimed is:

1. A disk cassette shutter to be slidably placed on a protective envelope containing a recording disk to cover slots formed in the opposite side walls of the protective envelope, comprising:

a substantially U-shaped laminated sheet;

the laminated sheet comprising:

a first layer forming an outer surface of the disk cassette shutter, said first layer being formed from a resin and a heat resistant material;

a second layer forming the inner surface of the disk cassette shutter, said second layer being formed from a resin and a lubricant; and an adhesive for securing said first layer to said second layer such that substantially all of said first and second layers are in contact with said adhesive.

2. A disk cassette shutter according to claim 1, wherein the laminated sheet includes a metal layer affixed between said first and second layers.

3. A disk cassette shutter according to claim 1, wherein the disk cassette shutter comprises a pair of side walls for closing the slots formed on the protective envelope, and a wall connecting the pair of side walls, and is formed by folding the laminated sheet into a shape having a substantially U-shaped cross section.

4. A disk cassette shutter according to claim 1, wherein the first layer of the laminated sheet is transparent, and the second layer of the laminated sheet is opaque.

5. A disk cassette shutter according to claim 4, wherein a transparent sheet having a pattern layer formed by printing on one surface thereof is sandwiched between the transparent first layer and the opaque second layer.

6. A disk cassette shutter according to claim 4, wherein a transparent sheet having a pattern layer formed by an evaporation process on one surface thereof is sandwiched between the transparent first layer and the opaque second layer.

7. A disk cassette shutter according to claim 4, wherein a holographic pattern is formed between the transparent first layer and the opaque second layer.

8. A disk cassette shutter according to claim 1, wherein said resin included in said first layer is selected from the group consisting of polypropylene and polyamide resin.

9. A disk cassette shutter according to claim 1, wherein said heat-resistant material is selected from the group consisting of talc, mica, and glass fibers.

10. A disk cassette shutter according to claim 1, wherein said resin included in said second layer is selected from the group consisting of polyacetal resin, polypropylene resin, polyamide resin, and polyethylene resin.

11. A disk cassette shutter according to claim 1, wherein said lubricant is selected from the group consisting of molybdenum sulfide powder, olefin powder, and silicon powder.

12. A disk cassette shutter to be slidably placed on a protective envelope containing a recording disk to cover slots formed in the opposite side walls of the protective envelope, comprising:

a laminated sheet having a pair of side walls for closing the slots formed on the protective envelope, and a wall connecting the pair of side walls, said walls being formed by folding the laminated sheet into a shape having a substantially U-shaped cross section;

the laminated sheet comprising:

a first layer forming a transparent outer surface of the disk cassette shutter, said first layer being made of a mixture of resin and a heat resistant material;

a second layer forming an opaque inner surface of the disk cassette shutter, said second layer being made of a mixture of a resin and a lubricant;

a third pattern bearing layer sandwiched between said first and second layers;

said first, second and third layers being fixed together by glue such that substantially all of said first, second and third layers are in contact with said glue.

13. A disk cassette shutter to be slidably placed on a protective envelope containing a recording disk to cover slots formed in the opposite side walls of the protective envelope, comprising:

a first layer forming an outer surface of the disk cassette shutter, said first layer being formed from a resin and a heat resistant material;

a second layer forming the inner surface of the disk cassette shutter, said second layer being formed from a resin and a lubricant, wherein the disk cassette shutter is formed by the steps of:

securing said first layer to said second layer with an adhesive to form a lamination such that substantially all of said first and second layers are in contact with said adhesive;

punching said lamination into a predetermined shape;

heating said lamination to a sufficient temperature to enable folding of said lamination; and folding said lamination into a substantially U-shaped configuration.

* * * * *